(12) United States Patent
Mosebach et al.

(10) Patent No.: US 11,344,159 B2
(45) Date of Patent: May 31, 2022

(54) FOOD PREPARATION DEVICE WITH OVERPRESSURE DETECTION

(71) Applicant: Vorwerk & Co. Interholding GmbH, Wuppertal (DE)

(72) Inventors: Andrej Mosebach, Bochum (DE); Robert Frielinghaus, Bochum (DE)

(73) Assignee: Vorwerk & Co. Interholding GmbH

( * ) Notice: Subject to any disclaimer, the term of this patent is extended or adjusted under 35 U.S.C. 154(b) by 465 days.

(21) Appl. No.: 16/213,414

(22) Filed: Dec. 7, 2018

(65) Prior Publication Data

US 2019/0174962 A1 Jun. 13, 2019

(30) Foreign Application Priority Data

Dec. 12, 2017 (EP) .................................... 17206570

(51) Int. Cl.
*A47J 43/07* (2006.01)
*A47J 27/00* (2006.01)
(Continued)

(52) U.S. Cl.
CPC ......... *A47J 43/0761* (2013.01); *A47J 27/004* (2013.01); *A47J 43/0716* (2013.01);
(Continued)

(58) Field of Classification Search
CPC .. A47J 27/004; A47J 43/0716; A47J 43/0722; A47J 43/0761; A47J 27/08; A47J 27/0802; A47J 27/0804; A47J 27/086; A47J 27/09; A47J 43/0705–0722; A47J 43/075–087; A47J 27/0817–09; A47J 2027/008; A47J 43/04; A47J 43/044; A47J 43/04418; A47J 43/04427; A47J 43/04454; A47J 43/046; A47J 43/0465; A47J 43/06; A47J 43/07; A23L 3/0155; A23L 5/17
(Continued)

(56) References Cited

U.S. PATENT DOCUMENTS

| | | | |
|---|---|---|---|
| 2011/0154995 A1 | 6/2011 | Watanabe et al. | |
| 2017/0007063 A1* | 1/2017 | Maier | A47J 43/255 |
| 2018/0271322 A1* | 9/2018 | Thai | A47J 43/0716 |

FOREIGN PATENT DOCUMENTS

| | | | | |
|---|---|---|---|---|
| DE | 102012222147 A1 * | 6/2014 | | F04D 25/08 |
| EP | 2529650 A1 | 12/2012 | | |

(Continued)

OTHER PUBLICATIONS

European Search Report for Application No. 17206570.8-1006, dated Jun. 14, 2018, 8 pages.

*Primary Examiner* — Drew E Becker
*Assistant Examiner* — Austin Parker Taylor
(74) *Attorney, Agent, or Firm* — Barnes & Thornburg LLP

(57) ABSTRACT

The invention concerns a food preparation device 1 comprising a food preparation pot 2, a heating element 3 for heating food 4 in the food preparation pot 2, a tool 5 for blending and/or comminuting food 4 in the food preparation pot 2, a lid 6, 7 for the food preparation pot 2, and an electric motor 8 for rotating the tool 5. A monitoring unit monitors a power input of the electric motor 8 for detecting an overpressure in the food preparation pot 2. The invention also concerns a method and a computer program product. A very reliable detection of overpressure can thereby be enabled.

12 Claims, 2 Drawing Sheets

(51) Int. Cl.
  *A47J 27/08* (2006.01)
  *A47J 27/09* (2006.01)
(52) U.S. Cl.
  CPC ........ *A47J 43/0722* (2013.01); *A47J 27/0802* (2013.01); *A47J 27/0804* (2013.01); *A47J 27/09* (2013.01)
(58) Field of Classification Search
  USPC ......................................................... 426/231
  See application file for complete search history.

(56) References Cited

FOREIGN PATENT DOCUMENTS

| | | | |
|---|---|---|---|
| JP | 11225891 | A | 8/1999 |
| JP | 2014073290 | A | 4/2014 |
| WO | 2012042981 | A1 | 4/2012 |

* cited by examiner

FOOD PREPARATION DEVICE WITH OVERPRESSURE DETECTION

CROSS-REFERENCE TO RELATED APPLICATION

This application claims priority to and the benefit of European Patent Application No. 17206570.8, filed Dec. 12, 2017.

BACKGROUND

Description

The invention concerns a food preparation device comprising a food preparation pot, a heating element for heating food in the food preparation pot, a tool for blending and/or comminuting food in the food preparation pot, a lid for the food preparation pot, and an electric motor for rotating the tool. The invention also concerns a method and a computer program product.

In a food preparation device such as a kitchen appliance with a heating element and a mixing tool, the cooking result can be affected by build-up of pressure, depending on recipe and food to be prepared. However, also in such cases, a controllable cooking result shall be obtained.

It is problem of the invention to provide a further developed food preparation device.

Brief Summary

The problem is solved by a food preparation device according to the main claim as well as a method and a computer program product of the independent claims. Preferable embodiments are described in the subclaims.

For solving the problem, a food preparation device is provided which comprises a food preparation pot, a heating element for heating food in the food preparation pot, a tool for blending and/or comminuting food in the food preparation pot, a lid for the food preparation pot, and an electric motor for rotating the tool. A monitoring unit is arranged such that the monitoring unit can monitor a power input of the electric motor for detecting an overpressure in the food preparation pot. A controllable cooking result can thereby be obtained.

Depending on the food and/or recipe, a comparatively high or low pressure, which normally comes by itself in the food preparation pot, may be required for the desired cooking result. If there is a pressure deviation, this may for example influence the cooking time. Effects such as foam formation can already be influenced by small pressure differences.

Therefore, for example, if the recipe for a certain food provides for a certain overpressure, but the result of the detection does not reveal an overpressure, a notification can be output to the user or the recipe or food preparation parameters can be automatically adjusted, e.g. by extending the cooking time. This applies both to pressure-tight closable food preparation pots such as a pressure cooker and to non-pressure-tight closable food preparation pots for a conventional food processor. If, for example, material fatigue occurs with a lid seal, this can be a cause of a drop in pressure so that the planned pressure in the food preparation pot is not present.

The power input of an electric motor is the electrical energy required for operation. The power input can be specified as the electrical power P provided to the electric motor in watts and/or as the motor current in amperes supplied to the electric motor. If the electrical mains voltage remains substantially constant during operation, the electrical power and the motor current can have an approximately constant ratio to each other. The equation $P = U \times I$ with electrical power P, voltage U and motor current I can describe the correlation of electrical power and motor current mathematically.

During operation, the required electrical power of the electric motor changes depending on the blending or comminution process to be performed. For example, if one food causes a greater resistance during blending than another food due to its composition, the electric motor requires a different amount of electrical power when the other settings are identical for both foods. When blending food, the amount of required electrical power can also change due to changing the setting of the set rotational speed. In general, a motor control is provided in order to always supply the electric motor with the currently required electrical power.

The invention is now based on the insight that overpressure in the food preparation pot affects the power input of the electric motor.

By providing a monitoring unit which monitors the power input of the electric motor for detecting an overpressure in the food preparation pot, particularly reliable measures for controlling the cooking process and/or the pressure in the food preparation pot can thus be initiated actively or automatically, and/or the user can be informed of the presence of a certain pressure status, e.g. planned presence of an overpressure. A particularly reproducible cooking result can thus be achieved.

In addition to that, the build-up of overpressure can be detected generally without a change to the remaining common hardware. The use of a complex differential pressure sensor or absolute pressure sensor can be avoided. Retrofitting an existing device can therefore in many cases just be carried out by updating the software. Furthermore, the monitoring unit can be used in addition or complementary to other or already implemented solutions for overpressure detection, thus enabling particularly reliable detection of the pressure status.

In particular, the monitoring unit does not include a differential pressure sensor or an absolute pressure sensor which, for example, intervenes in the control of the food preparation device in the event of a certain overpressure.

The heating element is installed preferably outside the food preparation space in the food preparation pot so that the food can be heated via a heat-conducting pot bottom and/or a heat-conducting pot wall. The tool inside the food preparation space of the food preparation pot is preferably driven by a drive shaft which extends through a pot feedthrough. In general, a seal ensures that no liquid can leak out from the interior of the food preparation pot through the pot feedthrough to outside. The pot feedthrough extends in particular through the pot bottom, preferably in the middle of the pot bottom. The food preparation pot is open at the opposite side to the bottom of the pot, i.e. at the top. The lid covers the open top side of the food preparation pot.

In the food preparation pot there is substantially normal pressure before the start of the cooking process or before heating. Normal pressure means approx. 1 bar ambient pressure. An overpressure is generally present if a pressure greater than the normal pressure has built up inside the food preparation pot. The preparation of some food can be improved if a controllable overpressure is achieved in the food preparation pot. This can be the case, for example, with foam-forming recipes.

For the detection of an overpressure, at first, the power input of the electric motor is captured, i.e. measured or received from a motor control. Based on the captured power input of the electric motor, a monitoring value is determined, for example by signal processing. In particular, signal processing includes signal filtering and/or signal conversion of the captured power input. The determined monitoring value can correlate with the actual overpressure in the food preparation pot or at least be dependent on the actual overpressure in the food preparation pot.

In one embodiment, the monitoring value or the pressure status can be output in the form of a measure of the overpressure, preferably with the unit bar, e.g. "1.1 bar". In particular, the resulting overpressure can deviate from the actual overpressure in the food preparation pot by at most 20%, preferably by at most 15%, particularly preferred by at most 10%. In order to control the cooking process in a desired way, it may already be sufficient though if only the presence or absence of an overpressure can be reliably detected. This is because some food preparation processes change significantly if the pressure exceeds and/or falls below the 1-bar threshold.

In one embodiment, a detection criterion for a defined monitoring event is stored for the monitoring. In one embodiment, several detection criteria are stored in the monitoring unit each for a defined monitoring event. The monitoring event can for example be "No overpressure", "Not sufficient overpressure" or "Overpressure is present".

In particular, a defined monitoring event includes a detection threshold and optionally also a minimum temperature threshold, i.e. a minimum temperature. The minimum temperature will be discussed later in more detail. In particular, the detection threshold and/or the minimum threshold are applied to the monitoring value. If the monitoring value reaches the detection threshold or the minimum threshold, the corresponding monitoring event is output.

In one embodiment, the monitoring unit is arranged such that a food preparation parameter and/or a recipe for the food are adapted based on a result of the detection from the monitoring of the power input of the electric motor.

A food preparation parameter is for example the planned time (duration) of heating by the heating element. For example, a recipe can be adjusted by increasing the amount of liquid, starch or salt to be added. Deviating pressure conditions can thus be counteracted in order to achieve the desired cooking result at least approximately.

In one embodiment, during operation, a notification for the user is provided in dependency of the power input of the electric motor. Depending on the detected pressure status, e.g. there is no overpressure or an overpressure, a notification can then be output with a classification of the overpressure and/or an indication of an approximate level of the overpressure. In particular, the monitoring events form the classification. Preferably, depending on the classification of the detected overpressure, instructions in form of a note for controlling the pressure are output to the user in order to either increase or reduce the pressure. In particular, the notification is shown on a display of the food preparation device or transmitted to a smartphone of the user for alerting and displaying. Preferably, alternatively or supplementary, the notification is acoustical so that the user is informed, for example, by an audible signal.

In one embodiment, during operation, a locking unit 9 for the lid is controlled in dependency of the power input of the electric motor. For example, if the target pressure is not reached as a result of an aged lid seal, the lid can be pressed harder on the food preparation pot in one embodiment in order to support pressure build-up. In another alternative or supplementary embodiment, if the pressure is too low, a longer dwell time of the food in the closed food preparation pot can be ensured by keeping the lid closed (e.g., using a holding arm 19) for an extended period of time. In particular, the locking unit 9 is able to lock (e.g., using the holding arm 19) at least the lid in a closed position on the food preparation pot and to unlock the lid for open the food preparation pot.

In one embodiment, during operation, the locking unit cannot be unlocked if an overpressure in the food preparation pot is detected, in particular until a defined release criterion is met. For example, when an overpressure has been detected, the user cannot unlock the locking unit, for example, if this would have a negative effect on the cooking result.

The release criterion may, for example, be defined in such a way that, after detection of an overpressure in the food preparation pot, the locking unit cannot be unlocked until no overpressure or at least no relevant overpressure is detected. For certain foods, this indicates the food is ready (preparation completed), for example because the entire liquid content has evaporated. In one alternative or supplementary embodiment, the release criterion is defined such that a monitoring value, which correlates with the overpressure, falls below a defined release threshold. In this way, the food can be left to simmer for a defined time at the detected pressure in order to achieve the desired cooking result.

In one embodiment, during operation, the heating power is manipulated in dependency of the power input of the electric motor, in particular increased, reduced and/or the heating element switched off. In this way, the cooking process can be controlled particularly effectively.

In one embodiment, during operation, a valve or outlet opening is opened in dependency of the power input of the electric motor. The overpressure can thus be reduced particularly quickly and the cooking process can be adapted with a particularly short reaction time.

In one embodiment, during operation, the monitoring unit monitors the power input of the electric motor for the detection of an overpressure in the food preparation pot only when a minimum temperature is reached in the food preparation pot. The monitoring effort can thus be reduced. An overpressure is normally caused by the evaporation of a liquid which occupies a larger volume in the vapor state than in the liquid state. Evaporation, and thus a practice-relevant overpressure that can influence the cooking result, can therefore occur normally only from certain temperatures. Below such temperatures, the effort for the detection of an overpressure can be saved.

The minimum temperature is a minimum temperature threshold, which is defined and in particular stored in the monitoring unit. Reaching a minimum temperature in the food preparation pot means that a measured temperature of the food preparation pot or in the food preparation pot reaches the minimum temperature. The food preparation device generally has a temperature sensor for measuring the temperature of the food preparation pot or in the food preparation pot.

Preferably, the minimum temperature is 50° C., 60° C., 80° C., 90° C., 96° C. or 100° C. At 50° C., water does not yet form air bubbles or visible steam. A reference recording of the power input of the electric motor without overpressure is thus possible. At 60° C., water forms small air bubbles, slowly creating visible steam. The influence of overpressure on recipe preparation is at 60° C. still relatively small. Defining (setting) the minimum temperature to be 60° C.

therefore has the advantage that a particularly long time period can be generated for capturing a reference recording of the power input of the electric motor without significant overpressure. At 80° C., water forms bubbles with the size of pearls which can already lead to a significant amount of steam. The time period for capturing a reference recording of the power input without significant overpressure is therefore relatively short, but at the same time the monitoring effort can be reduced by the relatively late activation of the monitoring unit. At 90° C., water forms rising air bubbles accompanied by running formation of steam. The recording of a reference recording of the power input is then only possible for a short time without the presence of a mentionable overpressure. At 96° C., liquid water increasingly evaporates to steam. Herewith, the monitoring effort is particularly low, but reference recoding will hardly be possible without at least a slight overpressure if the food preparation pot is sealed tightly against vapor. At 100° C., water evaporates at maximum speed, so that the pressure rises rapidly above normal pressure and reference recording without overpressure is not possible.

In one embodiment, depending on the power input of the electric motor, a measure is only initiated, if a minimum temperature is present, in particular 50° C., 60° C., 80° C., 90° C., 96° C. or 100° C. One measure is, for example, to control the locking unit for the lid in dependency of the power input of the electric motor, to manipulate the heating power or to provide a notification. Because the measure is only initiated at a minimum temperature, the control effort can be reduced.

In one embodiment, the monitoring unit comprises a detection threshold for the detection of an overpressure. The monitoring unit is arranged such that a monitoring event is output by the monitoring unit when a monitoring value reaches the detection threshold. The monitoring value is determined based on the captured power input of the electric motor. Captured power input means the power input measured or transmitted by a motor control.

In one embodiment, during operation, an overpressure is detected by comparing the captured power input of the electric motor or the monitoring value before and after a boiling point of a liquid or a selected temperature in the food preparation pot has been exceeded. The boiling point is often of particular relevance for the cooking process, so that a particularly efficient monitoring of the pressure status for controlling the cooking process can be achieved in this way. Furthermore, when the boiling point is reached, there is normally a relatively rapid increase in pressure or overpressure, which is reflected in the time-resolved power input of the electric motor. This also applies to the selected temperature, which is preferably set close to the boiling temperature. By comparing the recorded power input at a time before and after exceeding the boiling point or the selected temperature, the cooking process can be controlled particularly reliably. A comparison preferably includes signal processing of the captured power input of the electric motor before and after exceeding a boiling point or the selected temperature. In one embodiment, the boiling point is determined at least approximately through the measured temperature of the food preparation pot or in the food preparation pot and/or through recording a change in the heat capacity of the liquid.

In one embodiment, during operation, the detection threshold is determined based on the captured power input of the electric motor after a minimum temperature has been reached and/or before a maximum temperature or boiling point has been reached. By providing a minimum temperature and a maximum temperature, it can be ensured particularly effectively and in a simple manner that the detection threshold is determined based on a captured power input or reference recording while there was no or no significant overpressure in the food preparation pot. This enables particularly reliable monitoring.

The minimum temperature has already been explained above in detail. The maximum temperature is a maximum temperature threshold related to the temperature measured in the food preparation pot. In one embodiment, the minimum temperature is at least 50° C. and/or at most 90° C. In one embodiment, the maximum temperature is at least 70° C. and/or at most 96° C. An algorithm is provided to determine the detection threshold, i.e. to calculate it. In particular, signal processing of the captured power input is provided in order to provide an input variable for the algorithm that can be evaluated in an improved way.

In one embodiment, during operation, only after the selected temperature or boiling point has been reached, it is determined for the monitoring of the monitoring event whether the monitoring value reaches the detection threshold. The monitoring effort can thereby be reduced and the boiling process as well as the pressure or overpressure can be controlled particularly effectively.

The selected temperature is a temperature threshold related to the measured temperature in the food preparation pot, i.e. the measured temperature of the food preparation pot or the temperature measured in the food preparation pot. The selected temperature is generally defined in such a way that when the selected temperature is reached there is an increased formation of steam. Preferably, the selected temperature is 96° C. or 100° C. The selected temperature is stored in the monitoring unit.

In one embodiment, the monitoring value corresponds to a moving average value, a variation amplitude and/or a fundamental frequency of the captured power input of the electric motor, in particular the motor current. In general, a moving average value is an average value over a defined, traveling period of time. A particularly reliable monitoring, in particular by means of a detection threshold for the moving average value, the variation amplitude and/or the fundamental frequency, can thus be realized.

In one embodiment, the detection threshold is a travelling threshold or an absolute threshold. By means of a travelling threshold, e.g. a travelling tolerance band, a characteristic curve can be identified during pressure build-up, e.g. an exponentially rising curve. In particular, the captured power input of the electric motor at a selected temperature or boiling point is used to determine a travelling threshold. An absolute threshold makes it particularly easy to detect overpressure.

In one embodiment, the power input is determined through the motor current for the electric motor. The power input can thus be captured in a particularly simple time-resolved manner. In particular, the motor current level can be provided by the motor control and transmitted to the monitoring unit. Preferably, the monitoring unit monitors the power input of the electric motor to detect an overpressure in the food preparation pot by monitoring the motor current.

Another aspect of the invention concerns a method for detecting an overpressure in a food preparation pot of a food preparation device. The food preparation device comprises a heating element for heating food in the food preparation pot, a tool for blending and/or comminuting food in the food preparation pot, a lid for the food preparation pot, and an electric motor for rotating the tool. A monitoring unit monitors a power input of the electric motor for the detection of an overpressure in the food preparation pot. The features, embodiments and effects of the system for solving the problem described at the beginning also refer to this method.

Another aspect of the invention concerns a computer program product comprising instructions which, when the program of the computer program product is executed by a data processing unit, cause the data processing unit to execute the steps of the method according to the preceding claim. The features, embodiments and effects of the system for solving the problem described above apply accordingly to this computer program product. In particular, the data processing unit comprises the monitoring unit. In one embodiment, the data processing unit comprises a processor and a memory. In the memory, the program is usually stored, i.e., in the memory storable instructions or a computer program code. The processor, the memory and the computer program code are configured in such a way that a method with several method steps can be carried out. Method steps can be used, for example, to determine or calculate.

In the following, embodiment examples of the invention are explained in more detail based on figures. Features of the embodiment examples and further alternative or supplementary embodiments described below can be combined individually or in a plurality with the claimed objects. The claimed areas of protection are not limited to the embodiment examples.

BRIEF DESCRIPTION OF THE DRAWINGS

It is shown.

DETAILED DESCRIPTION

Figure 1:
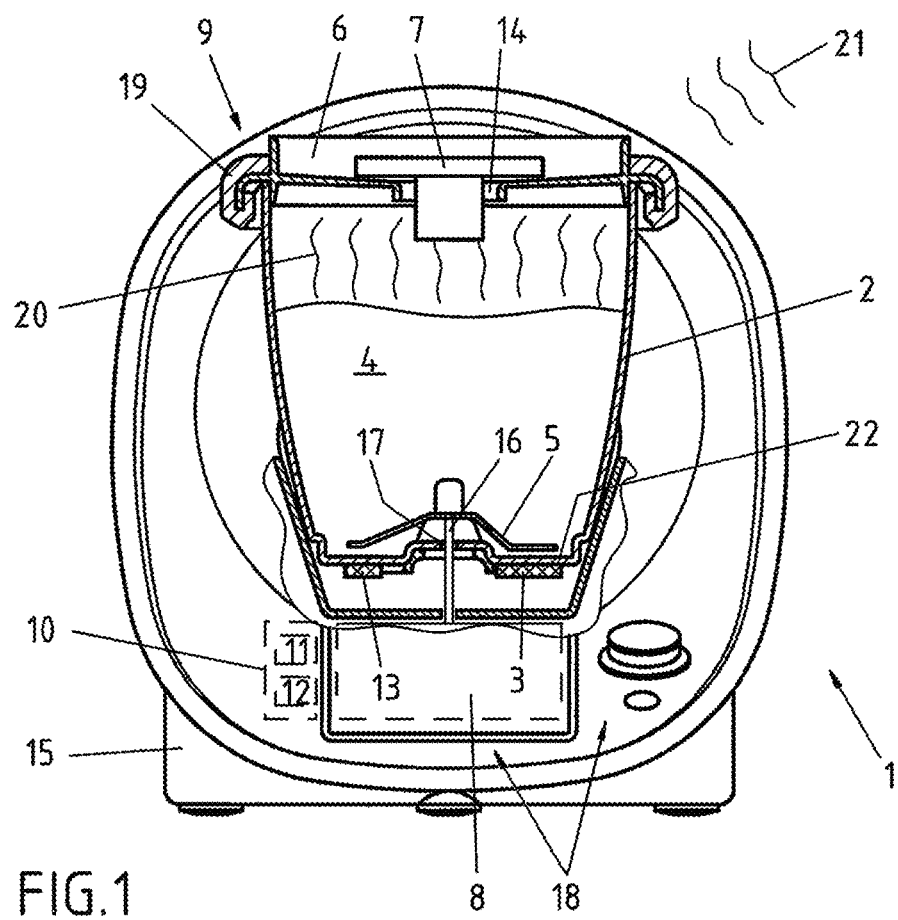
FIG. 1: Schematical front view of a food preparation device with a food preparation pot shown in cross-section.

FIG. 1 shows a food preparation unit 1 with a food preparation pot 2, in which a water-containing food such as soup is being cooked. The food 4 is heated by a heating element 3 and the temperature of the food 4 or in the food preparation pot 2 is measured approximately by the temperature sensor 13. A tool 5, in particular a mixing knife with radially projecting blades, for blending and/or comminuting food 4 in the food preparation pot 2 rotates during heating in order to avoid burning (of the food). An electric motor 8 can drive the tool 5 via a drive shaft 16, which extends through a pot feedthrough 17 to the tool 5 inside the food preparation pot 2. A data processing unit 10 with a processor 11 and a memory 12 is particularly integrated in the housing 15. A user interface 18 with a display and/or a control switch is also integrated in the housing 15.

A lid 6, 7 covers the open top side of the food preparation pot 2 and comprises a first lid element 6 and a second lid element 7. The disc-shaped first lid element 6 rests on the food preparation pot 2 and has a central lid opening 14 for inserting ingredients into the food preparation pot 2. The separate second lid element 7 serves to cover the lid opening 14. When cooking the food 4, rising steam 20 forms and the pressure in the food preparation pot 2 increases, especially after reaching the boiling point. In the case of overpressure, a compressive force occurs which acts in the direction of the pot bottom 22, so that an increased load or axial load on the drive shaft 16 causes increased friction in the bearing of the drive shaft 16. The increased friction in turn increases the load on the electric motor 8, which leads to a higher power input.

In particular, an increased current input can therefore be observed when overpressure is generated. The motor current I supplied to the electric motor 8 then increases as shown in FIG. 2.

Figure 2:
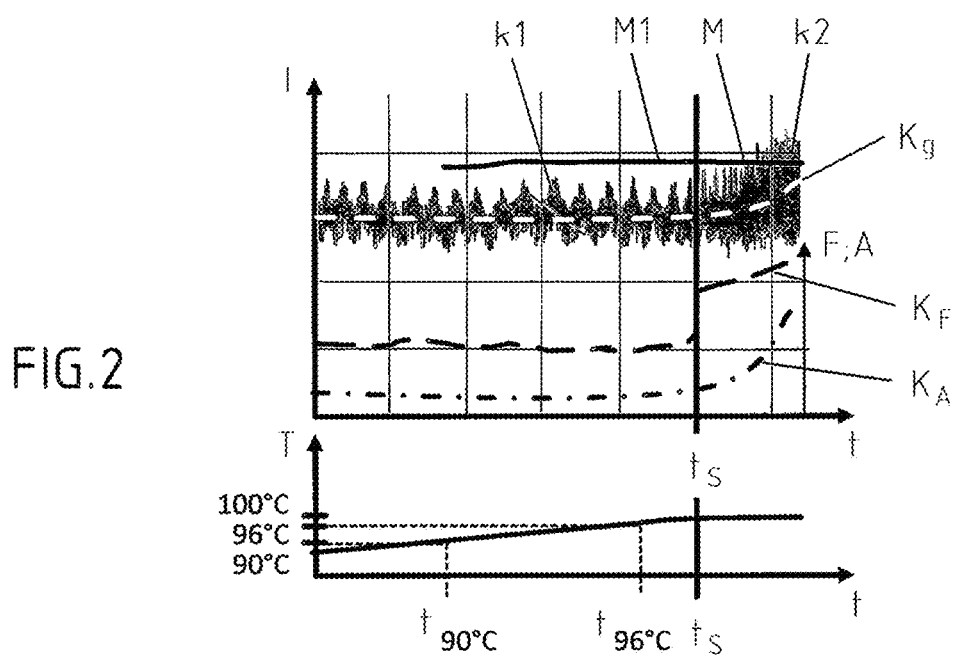
FIG. 2: Schematical illustration of a course of the power input of the electric motor over time during the preparation of a water-containing food in a food preparation pot.

FIG. 2 shows the motor current I over time tin a time window where the temperature just exceeds the boiling point at the time $t_S$. The steam 21 escapes for example intermittently as illustrated in FIG. 1. In particular, a series of smaller quantities of leaking steam 21 may escape as a result of overpressure. Having such leaking or leakings, the pressure drops abruptly by small amounts and rises again immediately. The load on the electric motor 8 can therefore fluctuate correspondingly more strongly compared to the cooking process without overpressure, especially before reaching the boiling point or a selected temperature. The greater variation of the load can lead to an increased fundamental frequency F and/or an increased amplitude A of the motor current I, as schematically illustrated in FIG. 2 by the curves $K_F$ (frequency curve) and $K_A$ (amplitude curve). Basically, when an overpressure occurs, the equilibrium of the complex system of motor control, friction losses, temperature and pressure increase, and motor behavior can change when the boiling point is exceeded. This can then be reflected in the changed power input over time. For reliable detection, it is therefore preferable to monitor the motor power input and its change when the boiling point is reached.

A pressure increase can therefore be inferred if the above described phenomena are observed or detected by the automatically operating monitoring unit with the aid of correspondingly defined detection criteria, which take into account, for example, the increased power input, an increased noise, the increased frequency of the fundamental oscillation, the increased oscillation amplitude of the fundamental oscillation or a characteristic curve of the power input over time. If a detection criterion for a specified monitoring event related to a certain degree of overpressure is met, the user is for example given a corresponding message in the form of a notification on the display.

The detection accuracy can be further improved by comparing the data before reaching the boiling point with the data after exceeding the boiling point. This is explained below by an example where the monitoring unit is arranged to monitor the monitoring event "Overpressure is present", which informs the user that the cooking result may be affected by an overpressure and prompting the user to reduce the cooking time. Alternatively, the cooking time can be reduced automatically. In this example, a soup is cooked. The temperature in the food preparation pot 2 rises, as schematically illustrated in FIG. 2. When a defined minimum temperature of 90° C. is reached (in FIG. 2 at the time $t_{90° C.}$), a moving average M1 for the later detection threshold M is calculated continuously by a corresponding algorithm on the basis of the recorded motor current I or curve k1. When a defined maximum temperature of 96° C. is reached, the moving average M1 calculated at that time $t_{96° C.}$ forms the detection threshold M for the monitoring event "Overpressure is present". Alternatively or additionally, the moving average M1 can be determined permanently until the boiling point is reached.

When a selected temperature or boiling point is reached, the moving average M1 of this time $t_S$ used as the detection threshold M, which is preferably constant, for monitoring the monitoring event. As FIG. 2 shows, the algorithm for the moving average M1 and thus for the detection threshold M includes a factor, e.g. 1.25, so that the detection threshold M is e.g. 25% higher compared to the moving average value Kg during the reference recording of the power input before reaching the selected temperature or boiling point $t_S$. In one embodiment, the reference measurement is carried out in particular within a time period that is dependent on the temperature, e.g. between the points in time $t_{90°\ C.}$ to $t_{96°\ C.}$, i.e. from a temperature of 90° C. to a temperature of 96° C.

In the example of FIG. 2, from the time $t_S$ on, the moving average value Kg using the detection threshold M is monitored once the boiling point is exceeded, i.e. 100° C. for food 4. The moving average value Kg is calculated on the basis of the motor current I that is recorded. In FIG. 2, curve k1 refers to the moving average value Kg before the boiling point and curve k2 to after the boiling point. When the moving average value Kg or curve k2 reaches the detection threshold M, the monitoring event "Overpressure is present" is detected. In FIG. 2, however, the moving average value Kg has yet not reached the detection threshold M. The overpressure is therefore, based on the monitoring, currently irrelevant for the prepared soup. Previously described measures would only be initiated upon detection of the monitoring event.

Figure 3:
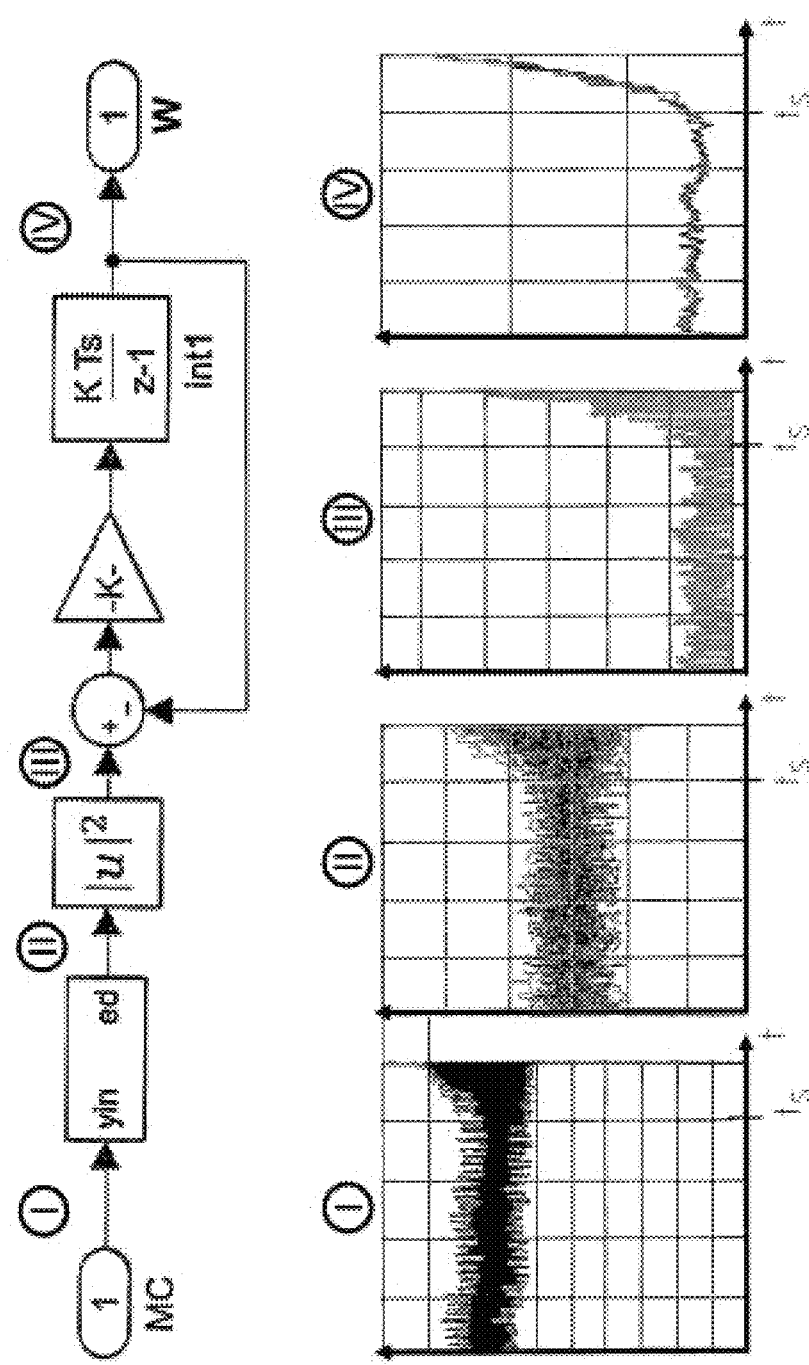
FIG. 3: Schematical representation of a block diagram for signal processing of the power input in the form of the motor current with illustrations I to IV of the thereby successively occurring signal changes over the time axis.

The reliability of the monitoring can be further increased by improving the processing and/or filtering of the signal of the power input or of the motor current I. For example, a monitoring value W can thereby be obtained. FIG. 3 shows an example of such signal processing using a block diagram. MC is the motor current I (see diagram I of FIG. 3).

The block diagram symbol with the input signal "yin" and the output signal "ed" represents a filter, in particular a so-called unknown-input-observer, which is preferably arranged such that the fundamental oscillation and/or the direct component of the input signal "yin" are removed (see diagram II of FIG. 3). "Yin" corresponds to the motor current I, i.e. the motor current signal. Preferably, the filter comprises a multi-dimensional integrator, preferably of the type "1/s". In one embodiment, the output signal "ed" is squared, which is indicated by the block diagram symbol "|u²|" in FIG. 3. Diagram III of FIG. 3 shows the resulting output signal.

In one embodiment, a further signal processing step or a further signal processing module is provided between this resulting output signal and the monitoring value W, which are arranged as described below.

A first-order delay element is provided which can typically be described by the following differential equation with a time constant T, a factor K, an input signal v(t) dependent on time t and an output signal y(t) also dependent on time t as well as its derivative $\dot{y}(t)$:

$$T \cdot \dot{y}(t) + y(t) = K \cdot v(t)$$

The noise can be smoothed by means of the first-order delay element. The triangular block diagram symbol "-K-" indicates an amplification factor. The amplification factor of the block diagram symbol "-K-" and the factor K of the differential equation can be different factors. The block symbol "Int1" refers to an integrator of the type indicated in the block diagram symbol.

In general, a food preparation device can be an oven, an automated cooker, a food processor or a pressure cooker. During operation, a food and/or ingredient is placed in the food preparation pot 2 and the food 4 is prepared in food preparation pot 2. In particular, the tool 5 and/or the heating element 3 are located near the bottom of the food preparation pot 2.

The invention claimed is:

1. A food preparation device comprising
a food preparation pot,
a heating element for heating food in the food preparation pot,
a tool for blending and/or comminuting food in the food preparation pot,
a lid for the food preparation pot, and
an electric motor for rotating the tool, wherein the food preparation device further comprises a monitoring unit configured to monitor a power input of the electric motor and to detect an overpressure in the food preparation pot based at least in part on the monitored power input, wherein the overpressure comprises vapor pressure inside the food preparation pot being greater than ambient pressure.

2. The food preparation device of claim 1, wherein the monitoring unit is configured to modify a food preparation parameter and/or a recipe for food based on the monitored power input of the electric motor.

3. The food preparation device of claim 1, wherein the food preparation device is configured such that, during operation, a notification for the user is provided based on the monitored power input of the electric motor.

4. The food preparation device of claim 1, wherein the food preparation device is configured such that, during operation, a locking unit for the lid is engaged or disengaged based on the monitored power input of the electric motor.

5. The food preparation device of claim 1, wherein the food preparation device is configured such that, during operation, an overpressure is detected by comparing the monitored power input of the electric motor before and after a boiling point ($t_S$) of a liquid or a selected temperature in the food preparation pot has been exceeded.

6. The food preparation device of claim 1, wherein the food preparation device is configured such that, during operation, the monitoring unit monitors the power input of the electric motor for the detection of an overpressure in the food preparation pot only when a minimum temperature in the food preparation pot is reached.

7. The food preparation device of claim 1, wherein the monitoring unit is configured such that a monitoring event is output by the monitoring unit when a monitoring value, which is determined based on the monitored power input of the electric motor, reaches a detection threshold (M).

8. The food preparation device of claim 7, wherein the monitoring value corresponds to a moving average value ($K_g$), a variation amplitude ($K_A$) and/or a fundamental frequency ($K_F$) of the captured power input of the electric motor.

9. The food preparation device of claim 7, wherein the detection threshold (M) is a travelling threshold or an absolute threshold.

10. The food preparation device of claim 7, wherein the food preparation device is configured such that, during operation, the detection threshold (M) is determined based on the monitored power input of the electric motor after a minimum temperature has been reached and/or before a maximum temperature or a boiling point ($t_S$) has been reached.

11. The food preparation device of claim 7, wherein that the food preparation device is configured such that, during operation, only after a selected temperature or the boiling point ($t_S$) has been reached, it is determined for monitoring the monitoring event whether the monitoring value reaches the detection threshold (M).

12. The food preparation device of claim 1, wherein the power input is determined through the motor current (I) for the electric motor.

* * * * *